(12) United States Patent
Myers et al.

(10) Patent No.: US 8,480,798 B1
(45) Date of Patent: Jul. 9, 2013

(54) VEHICLE SYSTEM TO SEPARATE AND STORE CARBON DIOXIDE FROM ENGINE EXHAUST

(75) Inventors: Bruce A. Myers, Kokomo, IN (US); David W. Ihms, Russiaville, IN (US)

(73) Assignee: Delphi Technologies, Inc., Troy, MI (US)

( * ) Notice: Subject to any disclaimer, the term of this patent is extended or adjusted under 35 U.S.C. 154(b) by 292 days.

(21) Appl. No.: 12/980,528

(22) Filed: Dec. 29, 2010

(51) Int. Cl.
*B01D 53/14* (2006.01)

(52) U.S. Cl.
USPC ............. 96/242; 95/183; 95/236; 55/385.3; 55/DIG. 30

(58) Field of Classification Search
None
See application file for complete search history.

(56) References Cited

U.S. PATENT DOCUMENTS

| | | | |
|---|---|---|---|
| 3,282,047 A * | 11/1966 | Wertheimer | 60/295 |
| 3,630,030 A * | 12/1971 | Wagner | 60/274 |
| 3,979,906 A * | 9/1976 | Staggs | 60/310 |
| 4,722,305 A * | 2/1988 | Haskell | 123/41.27 |
| 4,777,796 A * | 10/1988 | McEachern, Jr. | 60/310 |
| 5,121,602 A * | 6/1992 | McCorvey | 60/310 |
| 5,857,324 A * | 1/1999 | Scappatura et al. | 60/274 |
| 6,387,337 B1 | 5/2002 | Pennline et al. | |
| 6,398,851 B1 * | 6/2002 | Bose | 95/273 |
| 6,475,460 B1 | 11/2002 | Max | |
| 6,547,854 B1 | 4/2003 | Gray et al. | |
| 6,613,130 B2 * | 9/2003 | Givargis | 95/287 |
| 6,733,667 B2 | 5/2004 | Max | |
| 7,056,482 B2 | 6/2006 | Hakka et al. | |
| 7,067,456 B2 | 6/2006 | Fan et al. | |
| 2007/0208432 A1 * | 9/2007 | Hawrysz | 700/1 |
| 2008/0031801 A1 | 2/2008 | Lackner et al. | |
| 2008/0044335 A1 | 2/2008 | Anttila et al. | |
| 2010/0051859 A1 | 3/2010 | House et al. | |
| 2010/0229720 A1 * | 9/2010 | Sonwane et al. | 95/46 |
| 2010/0284866 A1 | 11/2010 | Jang et al. | |
| 2011/0052453 A1 * | 3/2011 | McLarnon et al. | 422/170 |

FOREIGN PATENT DOCUMENTS

| | | |
|---|---|---|
| EP | 1857169 | 12/2007 |
| WO | 2009084887 | 7/2009 |

OTHER PUBLICATIONS

Lackner, Klaus S.: "Washing Carbon Out of the Air", Scientific American, Jun. 2010, pp. 66-71.
European Search Report dated Apr. 2, 2012.

* cited by examiner

*Primary Examiner* — Duane Smith
*Assistant Examiner* — Phillip Shao
(74) *Attorney, Agent, or Firm* — Lawrence D. Hazelton

(57) ABSTRACT

A system for separating and storing carbon dioxide (CO2) in exhaust produced by an internal combustion engine. The system uses a scrubber tank containing a carbon dioxide absorbent fluid to capture CO2 in the exhaust. The system also includes a carbon dioxide storage means configured to temporarily store the captured CO2, and a CO2 recovery facility to refine the captured CO2 for future use or prepare the CO2 for permanent storage. The system is intended for installation on vehicles such as automobiles to reduce the amount of CO2 emitted by automobiles into the environment, but could also be used for other applications such as stationary power generators.

6 Claims, 2 Drawing Sheets

VEHICLE SYSTEM TO SEPARATE AND STORE CARBON DIOXIDE FROM ENGINE EXHAUST

TECHNICAL FIELD OF INVENTION

The invention generally relates to a system for separating or capturing carbon dioxide gas from internal combustion engine exhaust and then storing that gas. More particularly, the invention relates to a system using a carbon dioxide absorbent fluid to capture or extract the carbon dioxide gas and then heating the carbon dioxide absorbent fluid to release the carbon dioxide gas so it can be stored or further processed.

BACKGROUND OF INVENTION

Most internal combustion engine emit carbon dioxide (CO2) as a by-product of an internal combustion process. Some government regulations are directed at reducing emissions of CO2, in particular vehicle related CO2 emissions.

SUMMARY OF THE INVENTION

In accordance with one embodiment of this invention, a system for separating carbon dioxide gas from internal combustion engine exhaust is provided. The system includes an internal combustion engine, a heat exchanger, a scrubber tank, a pump, and a carbon dioxide storage means. The internal combustion engine is configured to emit exhaust gas when operating. The exhaust gas is characterized as having an elevated temperature and comprises carbon dioxide. The heat exchanger is configured to cool the exhaust gas emitted by the internal combustion engine. The scrubber tank contains a carbon dioxide absorbent fluid and is configured to bubble exhaust gas from the heat exchanger through the carbon dioxide absorbent fluid. By this process carbon dioxide gas is absorbed by the carbon dioxide absorbent fluid. The pump is configured to urge the carbon dioxide absorbent fluid through the heat exchanger so that the carbon dioxide absorbent fluid is heated as the exhaust gas is cooled. Heating the carbon dioxide absorbent fluid releases stored carbon dioxide. The carbon dioxide storage means is configured to store the carbon dioxide released in the heat exchanger.

In another embodiment of the present invention, a system for separating carbon dioxide gas from exhaust from an internal combustion engine configured to propel a vehicle is provided. The internal combustion engine is configured to emit exhaust gas when operating. The exhaust gas is characterized as having an elevated temperature and comprises carbon dioxide. The system includes a heat exchanger, a scrubber tank, a pump, and carbon dioxide storage means. The heat exchanger is configured to cool the exhaust gas emitted by the internal combustion engine. The scrubber tank contains a carbon dioxide absorbent fluid and is configured to bubble exhaust gas from the heat exchanger through the carbon dioxide absorbent fluid. By this process carbon dioxide gas is absorbed by the carbon dioxide absorbent fluid. The pump is configured to urge the carbon dioxide absorbent fluid through the heat exchanger so that the carbon dioxide absorbent fluid is heated as the exhaust gas is cooled. Heating the carbon dioxide absorbent fluid releases stored carbon dioxide. The carbon dioxide storage means is configured to store the carbon dioxide released in the heat exchanger.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

Figure 1:
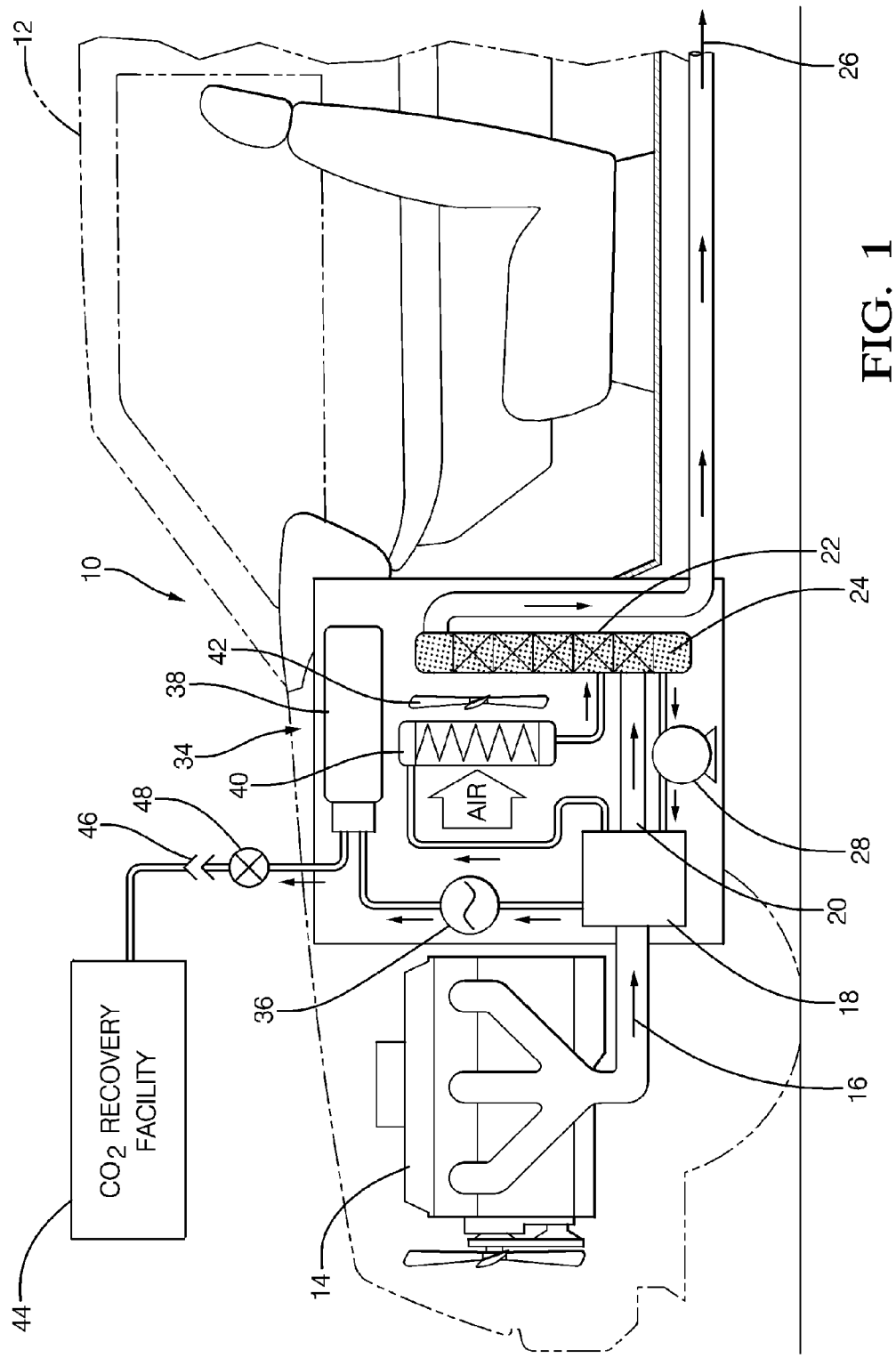
FIG. 1 is a diagram of a system for separating carbon dioxide gas from internal combustion engine exhaust in accordance with one embodiment.

In accordance with an embodiment of a system 10 for separating carbon dioxide gas from internal combustion engine exhaust, FIG. 1 illustrates a non-limiting example of vehicle 12 equipped with such a system. The system 10 may include an internal combustion engine 14 that may be configured to propel the vehicle 12. Examples of suitable internal combustion engines include, but are not limited to, gasoline spark ignition engines, compression ignition engines fueled with gasoline or diesel fuel, turbine engines, hybrid combustion/electric engines, and fuel cells such as solid oxide fuel cells. In general, these internal combustion engines emit exhaust gas 16 when operating, and the exhaust gas 16 is generally characterized as having an elevated temperature. The exhaust gas may also include elevated levels of carbon dioxide. While not specifically shown, the exhaust gas will generally be downstream from known engine exhaust after treatment devices such as a catalytic converter. In the non-limiting example shown in FIG. 1, the internal combustion engine 14 is generally configured to propel the vehicle 12.

The system 10 may include a heat exchanger 18 configured to cool the exhaust gas 16 emitted by the internal combustion engine 14, and so cooled exhaust gas 20 is generally passed out of the heat exchanger 18 to a scrubber tank 22. A more detailed explanation of the heat exchanger 18 is provided below with regard to FIG. 2.

The scrubber tank 22 is generally configured to contain a carbon dioxide absorbent fluid 24, hereafter often fluid 24. The scrubber tank 22 is also configured to bubble cooled exhaust gas 20 from the heat exchanger 18 through the carbon dioxide absorbent fluid 24, whereby carbon dioxide gas in the cooled exhaust gas 20 is absorbed by the fluid 24. A suitable material for the fluid is Novec™ HFE7600 produced by 3M Company. It is noted that 3M primarily markets this fluid as a heat transfer medium for use in electronics and other cooling applications. However it was recognized that HFE7600 had a particularly large capacity to absorb CO2 and so may be useful to preferentially capture CO2.

Several known gas scrubber configurations would be suitable for use as or within the scrubber tank 22 to bring the fluid 24 into intimate contact with the cooled exhaust gas 20 to maximize the amount of CO2 removed from the cooled exhaust gas 20. After the cooled exhaust gas passes through the scrubber tank 22, scrubbed exhaust gas 26 is emitted by the system 10.

The system 10 may also include a pump 28 configured to urge the fluid 24 through the heat exchanger 18, wherein the fluid 24 is heated as heat is transferred from the exhaust gas 16 to form cooled exhaust gas 20. The pump 28 is illustrated as being located between the heat exchanger 18 and the scrubber tank 22, but it could be located elsewhere in the circulation path of the fluid 24. As such the location of the pump 28 illustrated is a non-limiting example.

Figure 2:
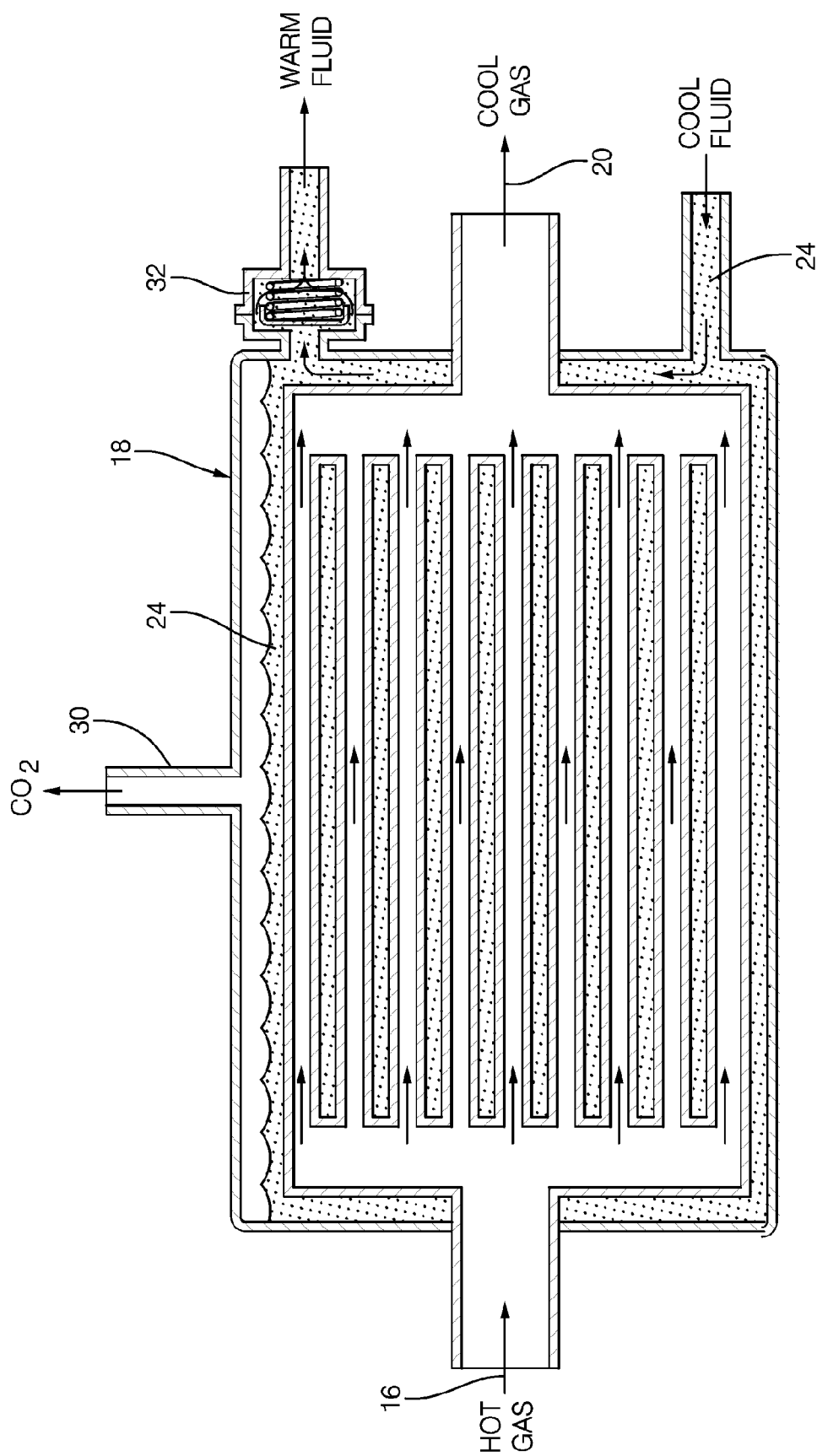
FIG. 2 is a diagram of a heat exchanger in the system of FIG. 1 in accordance with one embodiment.

FIG. 2 illustrates a non-limiting example of the heat exchanger 18. While not subscribing to any particular theory, but applying thermodynamic principles of heat conduction to the heat exchanger 18; as the exhaust gas 16 passes through the heat exchanger 18, heat is drawn out of the exhaust gas 16 so cooled exhaust gas 20 exits the heat exchanger 18. Heat is drawn out of the exhaust gas 16 and transferred to the fluid 24, whereby the carbon dioxide absorbent fluid 24 releases the carbon dioxide (CO2) gas that was absorbed when the fluid was in the scrubber tank 22. The arrangement of the system 10 includes an inherent energy-efficiency in that the system 10 uses heat in the exhaust gas 16 for heating the fluid 24 to release the CO2, and so does not need to provide a separate heat source to release the CO2 from the fluid 24.

As suggested by FIG. 2, the CO2 generally rises out of the fluid 24 to the top of the heat exchanger 18 and accumulates around a CO2 gas outlet 30. In one embodiment, the heat exchanger 18 may include a thermostat 32 to help regulate the temperature of the fluid 24 exiting the heat exchanger 18 so that the amount of CO2 removed from the fluid 24 is maximized. It is noted that the heat exchanger 18 is generally configured to keep the exhaust gas 16 and the cooled exhaust gas 20 separated from the fluid 24, but does facilitate heat transfer from the exhaust gas 16 to the fluid 24.

Referring again to FIG. 1, the system 10 may also include a carbon dioxide storage means 34 configured to store the carbon dioxide released by the fluid 24 in the heat exchanger 18. As suggested by FIG. 1, one embodiment of the CO2 storage means 34 may include a compressor 36 and a storage tank 38. The compressor 36 and the storage tank 38 may be configured to store CO2 in liquid form. Also, the storage tank 38 is preferably sized so that the storage tank 38 does not need to be emptied any more frequently than the fuel tank (not shown) of the vehicle 12 needs to be filled with fuel.

The system 10 or the carbon dioxide storage means 34 may also include a carbon dioxide recovery facility 44, hereafter often facility 44. The facility is generally configured to empty the storage tank 38. The facility 44 may be part of a vehicle fueling station so that when the vehicle 12 is refueled, the storage tank 38 can be emptied. The storage tank 38 may be emptied by, for example, coupling the facility 44 to the storage tank 38 via a connection 46 and then operating a valve 48 so the contents of the storage tank 38 can be transferred to the facility 44. The facility 44 may be simply a larger storage tank that stores the contents from several vehicle storage tanks to await later transfer to a processing facility, or the facility 44 may be equipped to refine the contents received from the storage tank 38 and package carbon dioxide for storage at a permanent storage facility or for use by a consumer of carbon dioxide. The refinement process may also include recovering other chemicals or pollutants present in the storage tank 38, for example, but not limited to, carbon monoxide, nitric oxides, and unburned hydrocarbons.

The system 10 may also include a radiator 40 configured to receive fluid 24 from the heat exchanger 18 and cool the fluid 24 as it flows into the scrubber tank 22. The cooling by the radiator 40 may be assisted by a fan 42. It is desirable to cool the fluid 24 as much as possible since the fluid 24 generally is able to absorb more CO2 at lower temperatures, about 25 C for example, than at higher temperatures, 100 C for example.

Accordingly, a system 10 for separating and storing carbon dioxide (CO2) gas from exhaust produced by an internal combustion engine 14 is provided. CO2 is produced as the internal combustion engine 14 is operated, for example to propel a vehicle 12 or as a stationary power source. The system 10 removes at least some of the CO2 in the exhaust and stores that CO2 for later use or permanent storage, and so reduces the amount of CO2 released into the environment by the engine 14. The system 10 is particularly well suited for use on a vehicle because the vehicle regularly visits refueling stations where the storage tank 38 can be emptied.

While this invention has been described in terms of the preferred embodiments thereof, it is not intended to be so limited, but rather only to the extent set forth in the claims that follow.

We claim:

1. A system for separating carbon dioxide gas from internal combustion engine exhaust, said system comprising:
    an internal combustion engine configured to emit exhaust gas when operating, said exhaust gas characterized as having an elevated temperature and comprising carbon dioxide, said system is installed on a vehicle propelled by the internal combustion engine;
    a heat exchanger configured to cool the exhaust gas emitted by the internal combustion engine;
    a scrubber tank containing a carbon dioxide absorbent fluid and configured to bubble exhaust gas from the heat exchanger through the carbon dioxide absorbent fluid, whereby carbon dioxide gas is absorbed by the carbon dioxide absorbent fluid;
    a pump configured to urge the carbon dioxide absorbent fluid through the heat exchanger, wherein the carbon dioxide absorbent fluid is heated by heat from the exhaust gas, whereby the carbon dioxide absorbent fluid releases stored carbon dioxide; and
    a carbon dioxide storage means configured to store the carbon dioxide released in the heat exchanger.

2. The system in accordance with claim 1, wherein said system further comprises a radiator configured to receive carbon dioxide absorbent fluid from the heat exchanger and cool the carbon dioxide absorbent fluid as the carbon dioxide absorbent fluid flows into the scrubber tank.

3. The system in accordance with claim 1, wherein said carbon dioxide storage means comprises a compressor and a storage tank.

4. The system in accordance with claim 3, wherein said carbon dioxide storage means comprises a carbon dioxide recovery facility configured to empty the storage tank.

5. A system for separating carbon dioxide gas from exhaust from an internal combustion engine configured to propel a vehicle, said internal combustion engine configured to emit exhaust gas when operating, said exhaust gas characterized as having an elevated temperature and comprising carbon dioxide; said system comprising:
    a heat exchanger configured to cool the exhaust gas emitted by the internal combustion engine while the internal combustion engine operates;
    a scrubber tank containing a carbon dioxide absorbent fluid and configured to bubble exhaust gas from the heat exchanger through the carbon dioxide absorbent fluid, whereby carbon dioxide gas is absorbed by the carbon dioxide absorbent fluid and thereby removed from the exhaust gas;
    a pump configured to urge carbon dioxide absorbent fluid through the heat exchanger, wherein the carbon dioxide absorbent fluid is heated by heat from the exhaust gas, whereby the carbon dioxide absorbent fluid releases the carbon dioxide gas; and
    a carbon dioxide storage means configured to store the carbon dioxide released in the heat exchanger.

6. The system in accordance with claim 5, wherein said carbon dioxide storage means is configured to transfer contents in the storage tank to a carbon dioxide recovery facility.

* * * * *